United States Patent
Zupanc et al.

(10) Patent No.: US 7,065,972 B2
(45) Date of Patent: Jun. 27, 2006

(54) FUEL-AIR MIXING APPARATUS FOR REDUCING GAS TURBINE COMBUSTOR EXHAUST EMISSIONS

(75) Inventors: Frank J. Zupanc, Phoenix, AZ (US); Paul R. Yankowich, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/850,871

(22) Filed: May 21, 2004

(65) Prior Publication Data
US 2005/0257530 A1    Nov. 24, 2005

(51) Int. Cl.
*F02C 1/00*      (2006.01)
*F02G 3/00*      (2006.01)

(52) U.S. Cl. .............................. 60/748; 60/740; 60/737

(58) Field of Classification Search .................. 60/737, 60/739, 740, 748, 746, 747, 799, 772, 776; 239/399, 403–406
See application file for complete search history.

(56) References Cited

U.S. PATENT DOCUMENTS

| | | | | | |
|---|---|---|---|---|---|
| 3,703,259 | A | * | 11/1972 | Sturgess et al. | 239/400 |
| 3,811,278 | A | * | 5/1974 | Taylor et al. | 60/743 |
| 3,937,011 | A | * | 2/1976 | Caruel et al. | 60/737 |
| 3,972,182 | A | * | 8/1976 | Salvi | 60/743 |
| 4,425,755 | A | * | 1/1984 | Hughes | 60/39.55 |
| 4,842,197 | A | * | 6/1989 | Simon et al. | 239/5 |
| 5,062,792 | A | * | 11/1991 | Maghon | 431/284 |
| 5,165,241 | A | * | 11/1992 | Joshi et al. | 60/737 |
| 5,351,477 | A | * | 10/1994 | Joshi et al. | 60/39.463 |
| 5,373,693 | A | * | 12/1994 | Zarzalis et al. | 60/39.23 |
| 5,417,070 | A | * | 5/1995 | Richardson | 60/748 |
| 5,490,378 | A | * | 2/1996 | Berger et al. | 60/39.23 |
| 5,590,529 | A | * | 1/1997 | Joshi et al. | 60/737 |
| 5,638,682 | A | * | 6/1997 | Joshi et al. | 60/737 |
| 5,664,412 | A | * | 9/1997 | Overton | 60/39.23 |
| 5,675,971 | A | * | 10/1997 | Angel et al. | 60/746 |
| 5,680,766 | A | * | 10/1997 | Joshi et al. | 60/746 |
| 5,941,075 | A | * | 8/1999 | Ansart et al. | 60/748 |
| 5,966,937 | A | * | 10/1999 | Graves | 60/748 |
| 6,068,470 | A | * | 5/2000 | Zarzalis et al. | 431/187 |
| 6,141,967 | A | * | 11/2000 | Angel et al. | 60/737 |
| 6,311,496 | B1 | | 11/2001 | Alkabie | |
| 6,374,615 | B1 | * | 4/2002 | Zupanc et al. | 60/748 |
| 6,381,964 | B1 | * | 5/2002 | Pritchard et al. | 60/746 |
| 6,415,594 | B1 | * | 7/2002 | Durbin et al. | 60/772 |

(Continued)

*Primary Examiner*—William H. Rodriguez
(74) *Attorney, Agent, or Firm*—Ingrassia Fisher & Lorenz

(57) ABSTRACT

A fuel-air mixer for use in a combustion chamber of a gas turbine engine is provided. The fuel air mixing apparatus comprises an annular fuel injector having a plurality of discrete plain jet orifices, a first swirler wherein the first swirler is located upstream from the fuel injector and a second swirler wherein the second swirler is located downstream from the fuel injector. The plurality of discrete plain jet orifices are situated between the highly swirling airstreams generated by the two radial swirlers. The distributed injection of the fuel between two highly swirling airstreams results in rapid and effective mixing to the desired fuel-air ratio and prevents the formation of local hot spots in the combustor primary zone. A combustor and a gas turbine engine comprising the fuel-air mixer of the present invention are also provided as well as a method using the fuel-air mixer of the present invention.

23 Claims, 3 Drawing Sheets

U.S. PATENT DOCUMENTS

| | | |
|---|---|---|
| 6,470,684 B1 | 10/2002 | Wilbraham |
| 6,474,070 B1 * | 11/2002 | Danis et al. .................. 60/739 |
| 6,474,071 B1 | 11/2002 | Durbin et al. |
| 6,532,742 B1 | 3/2003 | Scarinci et al. |
| 6,550,251 B1 | 4/2003 | Stickles et al. |
| 6,609,376 B1 | 8/2003 | Rokke |
| 6,708,498 B1 * | 3/2004 | Stickles et al. ............... 60/776 |
| 6,758,045 B1 * | 7/2004 | Dimov et al. ................. 60/804 |
| 6,799,427 B1 * | 10/2004 | Calvez et al. ................. 60/737 |
| 6,862,889 B1 * | 3/2005 | Held et al. .................... 60/747 |
| 6,865,889 B1 * | 3/2005 | Mancini et al. ............... 60/737 |
| 2003/0089111 A1 | 5/2003 | Benelli et al. |

* cited by examiner ized landing fees for aircraft. Methods and apparatus for reducing the exhaust gas levels of pollutants emitted from gas turbine engines, particularly oxides of nitrogen ($NO_x$), carbon monoxide (CO), unburned hydrocarbons and smoke, are required to meet both current and anticipated emissions regulations for engine certification, as well as reducing engine cost of ownership issues in areas where emissions-based landing fees are imposed on customer's aircraft.

FUEL-AIR MIXING APPARATUS FOR REDUCING GAS TURBINE COMBUSTOR EXHAUST EMISSIONS

GOVERNMENT RIGHTS

This invention was made with Government support under NAS301136 awarded by NASA. The Government has certain rights in this invention.

BACKGROUND OF THE INVENTION

Environmental concerns are driving increased emphasis on reductions in gas turbine exhaust emissions, both from a regulatory and financial perspective, such as landing fees for aircraft. Methods and apparatus for reducing the exhaust gas levels of pollutants emitted from gas turbine engines, particularly oxides of nitrogen ($NO_x$), carbon monoxide (CO), unburned hydrocarbons and smoke, are required to meet both current and anticipated emissions regulations for engine certification, as well as reducing engine cost of ownership issues in areas where emissions-based landing fees are imposed on customer's aircraft.

Most modern approaches for reducing gas turbine exhaust emissions are based on limiting the peak flame temperatures produced in the primary mixing zone of the combustor. Tight control of the primary zone flame temperature, however, requires that fuel and primary zone air be mixed as thoroughly and rapidly as possible prior to combustion in order to avoid local hot spots which produce high $NO_x$ levels.

The problem of rapidly and thoroughly mixing the fuel and primary zone air has been addressed by the addition of swirlers at the site of fuel injection. For example, axial swirlers have been mounted inside and outside of an injector body of a mixer for use in the combustion chamber of a gas turbine engine. Alternatively, swirl cups have been used to mix fuel and air in which swirlers are located adjacent to one another downstream from a single fuel injector. While the air-fuel mixers of the prior art have helped to decrease undesirable emissions, combustion performance can be further improved upon by increasing the efficiency of mixing fuel and primary zone air prior to combustion of the fuel.

Therefore, there is a need for an air-fuel mixer with an increased efficiency of mixing fuel and primary zone air. There is a further need for an efficient air-fuel mixer that can be used with various types of gas turbine engines.

SUMMARY OF THE INVENTION

In one aspect of the present invention there is provided a fuel-air mixer, the fuel air mixing apparatus comprising a fuel injector having a discrete plain jet orifice; a first swirler wherein the first swirler is located upstream from the fuel injector; and a second swirler wherein the second swirler is located downstream from the fuel injector. The discrete plain jet orifice is confined between the highly swirling airstreams generated by the two radial swirlers. The fuel injector may further have a plurality of discrete jet orifices. The distributed injection of the fuel between two highly swirling airstreams results in rapid and effective mixing to the desired fuel-air ratio and prevents the formation of local hot spots in the combustor primary zone.

In another aspect of the present invention, there is provided a fuel-air mixer for use in a combustion chamber of a gas turbine engine, the fuel-air mixer comprising an annular fuel injector having a fuel delivery line fluidly connected to an annular fuel distribution manifold, wherein the annular fuel distribution manifold is fluidly connected to a plurality of discrete plain jet orifices and a first radial swirler wherein the first swirler is located upstream from the discrete plain jet orifices and wherein the fuel delivery line is located between swirler airflow passages of the first radial swirler; and a secondary swirler assembly comprising a second radial swirler wherein the second swirler is located downstream from the discrete plain jet orifices, a swirler exit throat downstream of the second swirler and a swirler exit quarl downstream of the swirler exit throat. The swirler exit quarl may be either converging, diverging or of a constant diameter relative to the swirler exit throat.

In yet another aspect of the invention, there is provided a combustor comprising a fuel-air mixer, the fuel-air mixer comprising an annular fuel injector having a fuel delivery line fluidly connected to an annular fuel distribution manifold, wherein the annular fuel distribution manifold is fluidly connected to a plurality of discrete plain jet orifices and a first radial swirler wherein the first swirler is located upstream from the discrete plain jet orifices and wherein the fuel delivery line is located between swirler airflow passages of the first radial swirler; and a secondary swirler assembly comprising a second radial swirler wherein the second swirler is located downstream from the discrete plain jet orifices, a swirler exit throat downstream of the second swirler and a swirler exit quarl downstream of the swirler exit throat.

In a further aspect of the invention, there is provided a gas turbine engine having a combustor comprising a fuel-air mixer, the fuel-air mixer comprising an annular fuel injector having a fuel delivery line fluidly connected to an annular fuel distribution manifold, wherein the annular fuel distribution manifold is fluidly connected to a plurality of discrete plain jet orifices; a first radial swirler wherein the first swirler is located upstream from the fuel injector and wherein the fuel delivery line is located between swirler airflow passages of the first radial swirler; a second radial swirler wherein the second swirler is located downstream from the fuel injector; a swirler exit throat downstream of the second swirler; and a swirler exit quarl downstream of the swirler exit throat. The gas turbine engine may have a conventional combustor design with near-stoichiometric primary zone fuel-air ratios in order to help reduce pattern and profile factor variations at the turbine outlet. Alternatively, the gas turbine engine may have a lean direct injection or a rich burn-quick quench-lean burn combustor arrangement in order to reduce NOx emissions.

In yet another aspect of the invention, there is provided a method for injecting fuel and air through a fuel-air mixer into a gas turbine engine combustor comprising the steps of injecting the fuel into the fuel-air mixer; swirling a portion of the air in a first swirl direction upstream of the injected fuel; swirling another portion of the air in a second swirl direction downstream of the injected fuel; and delivering a mixture of the injected fuel and firstly and secondly swirled air into the combustor. The fuel may be either liquid or gaseous fuel.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, a fuel-air mixer for use in a combustion chamber of a gas turbine engine is provided by the present invention. The fuel air mixing apparatus may comprise an annular fuel injector that may have a plurality of discrete plain jet orifices, a first swirler which is located upstream from the fuel injector, and a second swirler which is located downstream from the fuel injector. The plurality of discrete plain jet orifices may be confined between the highly swirling airstreams generated by the two radial swirlers. The distributed injection of the fuel between two highly swirling airstreams can result in rapid and effective mixing to the desired fuel-air ratio and prevents the formation of local hot spots in the combustor primary zone. The applicability of the fuel-air mixer is general in nature and may be utilized in conventional combustor designs with near-stoichiometric primary zone fuel-air ratios in order to help reduce pattern and profile factor variations at the turbine inlet. The air-fuel mixer of the present invention may also be used in advanced low-emissions combustor designs, such as, but not limited to, lean direct injection or rich burn-quick quench-lean burn combustors, in order to minimize primary zone flame temperature variations and the associated increased levels of $NO_x$ formation.

Further, the present invention provides an improved fuel-air mixer and method for injecting and rapidly mixing fuel and air into the combustor primary zone. Either gaseous or liquid fuel may be delivered to an injector body in a conventional manner through a single stem where the fuel may then be distributed in annular manifold in the injector body and then injected through one or more discrete plain jet orifices into a highly swirling air stream. The annular fuel manifold may be positioned between two radial swirlers, the first swirler being upstream of the manifold and the second swirler being downstream. This positioning of the manifold allows for the distributed injection of the fuel between two highly swirling airstreams, resulting in rapid and effective mixing to the desired fuel-air ratio and prevents the formation of local hot spots in the combustor primary zone. In contrast, the air-fuel mixers of the prior art that have more than one swirler have them positioned downstream from an injector port. By positioning one of the swirlers upstream of the discrete plain jet orifices, the fuel and air are mixed more efficiently.

Figure 1:
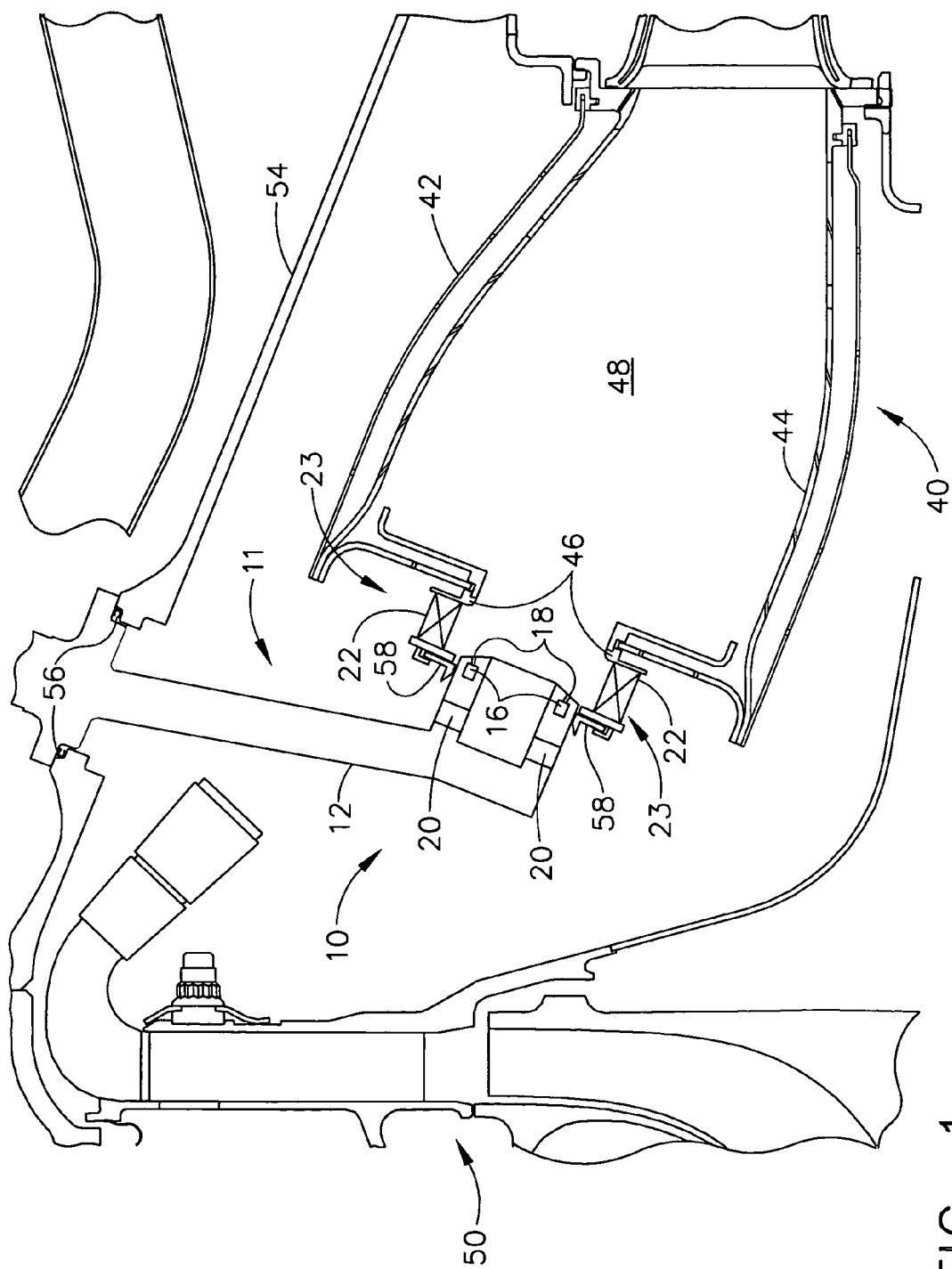
FIG. 1 shows an axial view through a portion of a gas turbine engine.

Illustrated in FIG. 1 is a portion a gas turbine engine 50, including an annular combustor 40 and a fuel-air mixer 10. The combustor 40 is conventionally configured with an outer liner 42, an inner liner 44 and a combustion chamber 48. The fuel-air mixer 10 may comprise a fuel injector assembly 11 and a secondary swirler assembly 23. The fuel air mixer 10 may be rigidly attached to the engine high pressure casing 54 through fuel injector 11 of fuel air mixer 10 in a conventional manner with sealed flanges 56. Likewise, fuel air mixer 10, through the secondary swirler 23, may be attached to the combustor 40 at interface 46 in a conventional manner such as, but not limited to, through either a brazing or welding process.

Figure 2:
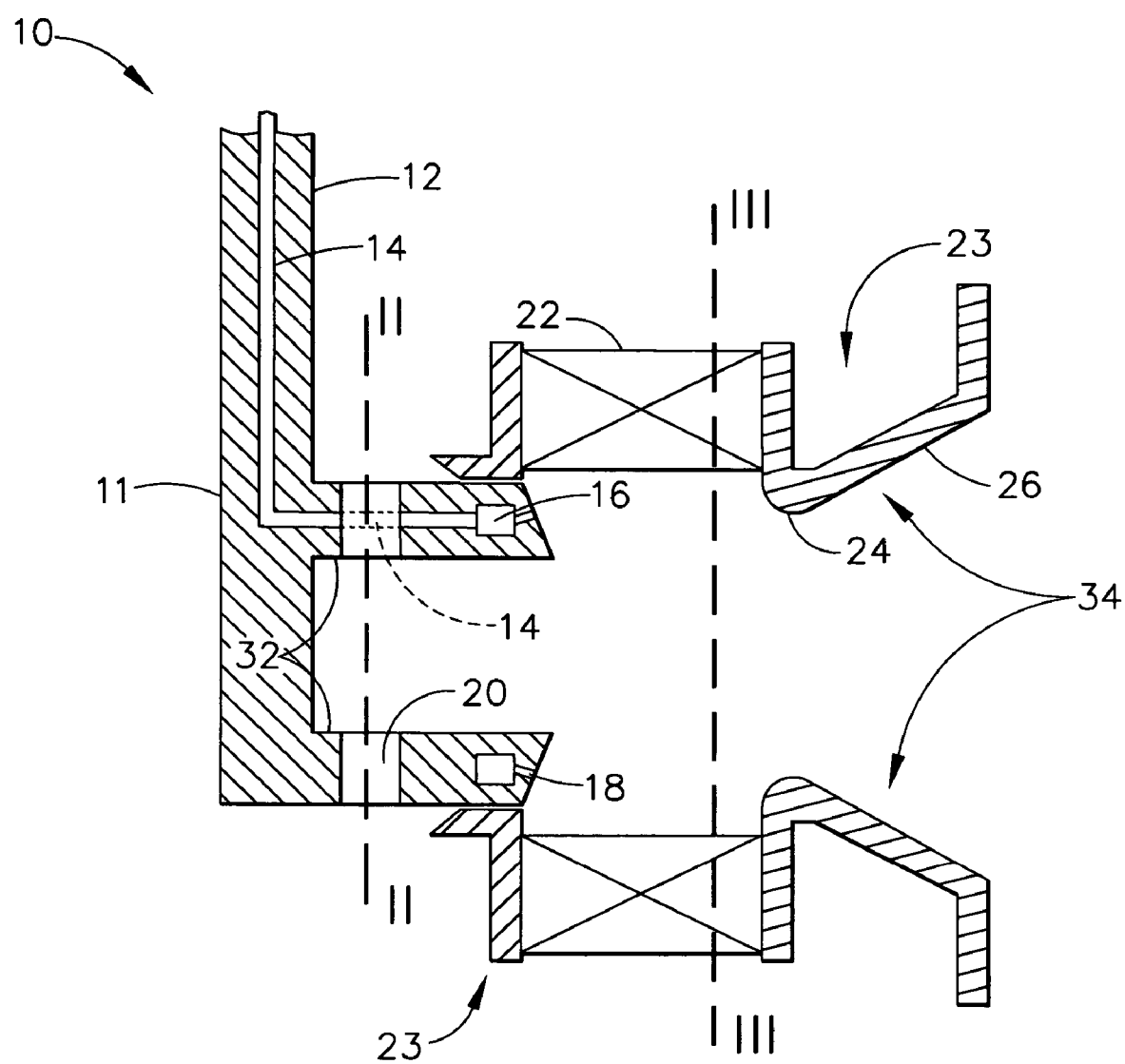
FIG. 2 shows a longitudinal section through a fuel-air mixing apparatus.

Referring to FIG. 2, a fuel-air mixer of the present invention is designated in its entirety by reference number 10. The fuel-air mixer 10 may have an upstream end 32 and a downstream end 34 opposite the upstream end. The fuel air mixer 10 may also comprise the annular fuel injector 11 and the secondary swirler assembly 23. The annular fuel injector 11 may further comprise a fuel injector stem 12, a fuel delivery line 14, a first radial inflow swirler 20, an annular fuel distribution manifold 16 and a plurality of discrete plain jet orifices 18. The fuel injector 11 may be inserted into the outer swirler assembly 23 through a sliding interface 58. Alternatively, the secondary swirler assembly 23 may comprise a second radial inflow swirler 22, swirler exit throat 24 and swirler exit quarl 26. The fuel injector 11 may be fixed relative to the outer swirler assembly 23. The fuel may be delivered to the mixer 10 by the annular fuel injector 11, and the injected fuel may be rapidly mixed with swirling air produced by the first swirler 20 and the second swirler 22. The resulting fuel-air mixture may then be delivered to a combustor through the swirl exit throat 24 and swirl exit quarl 26.

Figure 3:
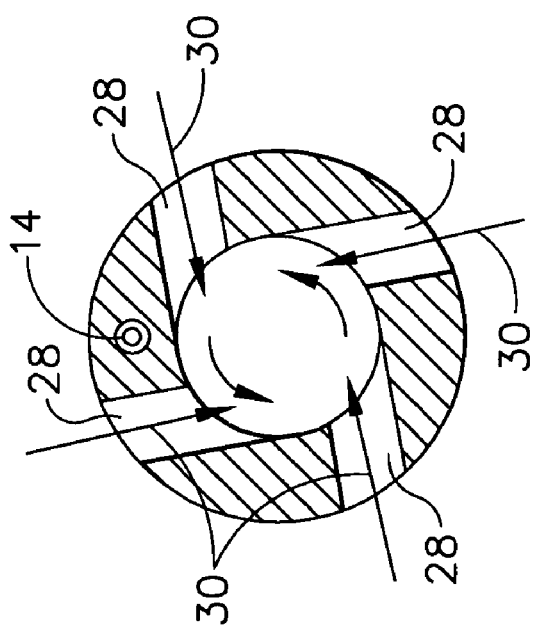
FIG. 3 shows a cross-sectional view along the line II—II of the fuel-air mixing apparatus of FIG. 2.

The annular fuel injector 11 may comprise a fuel injector stem 12 which may house a fuel delivery line 14. As shown in FIGS. 2 and 3, the fuel delivery line 14 may be located between two adjacent swirler airflow passages 28 of the first swirler 20. The fuel delivery line may deliver the fuel to the annular fuel distribution manifold 16. The fuel may be in either gaseous or liquid form. The manifold 16 may then distribute the fuel to one or more discrete plain jet orifices 18, where the fuel may then be injected into swirling air produced by the first swirler 20 and the second swirler 22.

Figure 4:
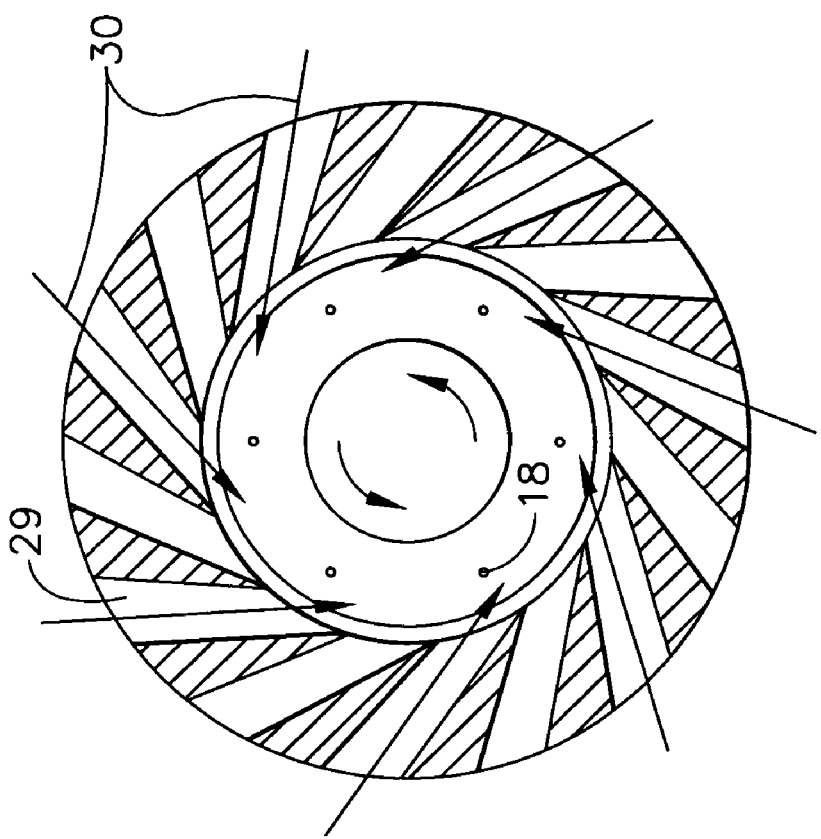
FIG. 4 shows a cross-sectional view along the line III—III of the fuel-air mixing apparatus of FIG. 2.

Referring to FIG. 4, there is shown a cross-sectional view of the fuel-air mixer 10 at the second swirler 22. In this embodiment of the present invention, there may be a plurality of discrete jet orifices 18 arranged in a circumferential pattern around the fuel-air mixer 10. By way of a non-limiting example, the plurality of discrete jet orifices 18 may be from about 3 to about 12 discrete jet orifices 18. The annular fuel distribution manifold 16 may be located between the first swirler 20 and the second swirler 22. The first swirler 20 may be upstream of the discrete plain jet orifices 18 while the second swirler may be downstream of the discrete plain jet orifices 18. With this configuration, the fuel is injected between two highly swirling airstreams which may result in a rapid and effective mixing of the fuel and air to give the desired fuel-air ratio and prevent the formation of local hot spots in the combustor primary zone.

In another embodiment, the discrete plain jet orifices 18 may be oriented radially outward and tangentially counter to the air delivered by the second swirler 22 to maximize the relative velocity between the fuel and air, enhancing mixing. When using a liquid fuel, atomization may be enhanced as well by maximizing the relative velocity between the fuel and air.

Referring to FIGS. 2, 3, and 4, the first swirler 20 may be located upstream from the second swirler 22. The first swirler 20 may be a radial inflow swirler. Furthermore, the swirler airflow passages 28 in the first swirler 20 may be, but not limited to, aerodynamic vanes, flat vanes or tangentially drilled holes. The second swirler 22 may be located downstream of the first swirler 20. In a manner similar to, but independent of the first swirler 20, the airflow passages 29 of the second swirler 22 may be, but not limited to, aerodynamic vanes, flat vanes or tangentially drilled holes. The first swirler 20 and the second swirler 22 may be oriented either co- or counter-swirled relative to each other. The rate of swirling with respect to each swirler may be sufficient so that the fuel and air are thoroughly mixed and delivered to the combustor in an efficient manner. The fuel-air mixture may be delivered to the combustor through the swirl exit throat 24 and the swirl exit quarl 26. The swirl exit quarl 26 may be converging, diverging or of constant diameter relative to the swirl exit throat 24 in order to achieve the desired recirculation pattern to give optimal mixing of the air and fuel. In one example, as shown in FIG. 2, the swirl exit quarl 26 may be diverging relative to the swirl exit throat 24.

Referring to FIGS. 3 and 4, there are shown cross-sectional views of the fuel-air mixer 10 at the first swirler 20 and the second swirler 22 respectively. As can be seen in FIG. 3, the fuel delivery line 14 may be situated between two adjacent swirler airflow passages 28 in the first swirler 20. The arrows 30 represent the illustrated air flow when the air mixer 10 is in operation. FIG. 4 shows the cross-sectional view at the second swirler 22. Again, the arrows 30 represent the illustrated air flow. The discrete plain jet orifices 18 are shown arranged circumferentially around the fuel-air mixer.

A combustor 40 comprising a fuel-air mixer 10 is also provided. The fuel-air mixer may comprise an annular fuel injector body 11 having a fuel delivery line 14, an annular fuel distribution manifold 16 and a plurality of discrete plain jet orifices 18. The fuel-air mixer may also have a first radial swirler 20 which may be located upstream from the discrete plain jet orifices 18, a second radial swirler 20 which may be located downstream from the discrete plain jet orifices 18, a swirler exit throat 24 downstream of the second swirler 22, and a swirler exit quarl 26 downstream of the swirler exit throat 24.

The fuel-air mixer 10 may be reversibly secured to the combustor 40 at interface 46. See FIG. 1. In a first illustrative embodiment, the outer swirler 22 of the fuel-air mixer 10 may be rigidly attached to the combustor 40 at interface 46. The rigid attachment may be by conventional means such as, but not limited to, a brazed or welded interface. The fuel injector 11 may be inserted into the outer swirler assembly 23 through a sliding interface 58 which allows for limited relative movement between the annular combustor assembly and the fuel injector. In a second illustrative embodiment, the second swirler assembly 23 may be attached to the combustor 40 through a sliding interface 46 while the fuel injector 11 may be fixed relative to the outer swirler assembly 23. Due to differences in thermal expansion between the hot combustor 40 and the relatively cool fuel injector 11, the combustor 40, which is rigidly attached to the engine at the aft end near the turbine nozzle inlet, must have some degree of float in the axial and radial direction relative to the fuel injector 11 which is rigidly attached at the flanges 56 on the engine high-pressure casing 54. Therefore, the sliding interface 58 may be typically located in some manner where the fuel-air mixer 10 comes into contact with the combustor 40. This installation also allows the fuel-air mixer 10 to be removed and serviced in a conventional manner without having to disassemble the engine 50.

The applicability of the air-fuel mixer 10 is designed to be general in nature for use with different combustors. In one embodiment, the air-fuel mixer 10 may be used with combustors having a conventional design with near-stoichiometric primary zone fuel-air ratios. In an alternative embodiment, the air-fuel mixer 10 of the present invention may be used with advanced low emissions combustor designs such as, but not limited to, lean direct injection or rich burn-quick quench-lean burn combustors.

The present invention also provides a gas turbine engine having a combustor comprising a fuel-air mixer. The fuel-air mixer may comprise an annular fuel injector body 11 having a fuel delivery line 14, an annular fuel distribution manifold 16 and a plurality of discrete plain jet orifices 18. The air-fuel mixer 10 may also have a first radial swirler 20 which may be located upstream from the plain jet orifices 18 and where the fuel delivery line 14 may be located between two adjacent swirler airflow passages 28 of the first radial swirler 20. The air-fuel mixer 10 may further have a second radial swirler 22 which may be located downstream from discrete plain jet orifices 18, a swirler exit throat 24 downstream of the second swirler 22, and a swirler exit quarl 26 downstream of the swirler exit throat 24. In one embodiment the gas turbine engine is an aircraft engine.

A method for injecting fuel and air through a fuel-air mixer into a gas turbine engine combustor is also provided. The method comprises the steps of injecting a fuel into a fuel-air mixer, swirling a portion of air in a first swirl direction upstream of the injected fuel, swirling another portion of air in a second swirl direction downstream of the injected fuel, and delivering a mixture of the injected fuel and firstly and secondly swirled air into the combustor. The fuel may be either liquid or gaseous fuel. The first and second swirling steps may swirl the air in co-rotation, with the second swirl direction being equal to the first swirl direction. Alternatively, the first and second swirling steps may swirl the air in counter-rotation, with the second swirl direction being opposite the first swirl direction. The fuel-air mixture may be delivered to the combustor through the swirl exit throat 24 and the swirl exit quarl 26. The swirl exit quarl 26 may be converging, diverging or of constant diameter relative to the swirl exit throat 24 in order to achieve the desired recirculation pattern to give optimal mixing of the air and fuel.

It should be understood, of course, that the foregoing relates to exemplary embodiments of the invention and that modifications may be made without departing from the spirit and scope of the invention as set forth in the following claims.

The invention claimed is:

1. A fuel-air mixer comprising:
   a fuel injector having a plurality of discrete plain jet orifices;
   a first swirler located upstream from the discrete plain jet orifices; and
   a second swirler located downstream from the discrete plain jet orifices; and
   wherein the first swirler and the second swirler are adjacent to the discrete plain jet orifices and the fuel injector further comprises a fuel delivery line located between swirler airflow passages of the first swirler.

2. The fuel-air mixer of claim 1 wherein the fuel injector is an annular fuel injector.

3. The fuel-air mixer of claim 1 wherein the plurality of discrete plain jet orifices are arranged circumferentially around the fuel injector.

4. The fuel-air mixer of claim 1 wherein the first and second swirlers have a co-swirled orientation.

5. The fuel-air mixer of claim 1 wherein the first and second swirlers have a counter-swirled orientation.

6. The fuel-air mixer of claim 1 wherein the first swirler comprises aerodynamic vanes, flat vanes or tangentially-oriented discretely drilled holes.

7. The fuel-air mixer of claim 1 wherein the second swirler comprises aerodynamic vanes, flat vanes or tangentially-oriented discretely drilled holes.

8. The fuel-air mixer of claim 1 wherein the first swirler is a radial swirler.

9. The fuel-air mixer of claim 1 wherein the second swirier is a radial swirler.

10. The fuel-air mixer of claim 1 wherein the fuel-air mixer further comprises a swirler exit throat downstream of the second swirler and a swirler exit quarl downstream of the swirler exit throat.

11. The fuel-air mixer of claim 10 wherein the swirler exit quarl is either converging, diverging or of a constant diameter relative to the swirler exit throat.

12. A fuel-air wiser for use in a combustion chamber of a gas turbine engine, the fuel-air mixer comprising:
   an annular fuel injector having a fuel delivery line fluidly connected to an annular fuel distribution manifold, wherein the annular fuel distribution manifold is fluidly connected to a plurality of discrete plain jet orifices and a first radial swirler wherein the first swirler is located upstream from the discrete plain jet orifices and wherein the fuel delivery line is located between swirler airflow passages of the first radial swirler; and
   a secondary swirler assembly comprising a second radial swirler wherein the second swirler is located downstream from the discrete plain jet orifices, a swirler exit throat downstream of to second swirler and a swirler exit quarl downstream of the swirler exit throat.

13. The fuel-air mixer of claim 12 wherein the first and second swirlers have a co-swirled orientation.

14. The fuel-air mixer of claim 12 wherein the first and second swirlers have a counter-swirled orientation.

15. The fuel-air mixer of claim 12 wherein the first and second swirlers independently comprise aerodynamic vanes, flat vanes or tangentially-oriented discretely drilled holes.

16. The fuel-air mixer of claim 12 wherein the plurality of discrete plain jet orificess are oriented radially outward and tangentially counter to air delivered by the second swirler.

17. A combustor comprising a fuel-air mixer, the fuel-air mixer comprising:
   an annular fuel injector having a fuel delivery line fluidly connected to an annular fuel distribution manifold, wherein the annular fuel distribution manifold is fluidly connected to a plurality of discrete plain jet orifices and a first radial swirler wherein the first swirler is located upstream from the discrete plain jet orifices and wherein the fuel delivery line is located between swirler airflow passages of the first radial swirler and
   a secondary swirler assembly comprising a second radial swirler wherein the second swirler is located downstream from the discrete plain jet orifices, a swirler exit throat downstream of the second swirler and a swirler exit quarl downstream of the swirler exit throat.

18. The combustor of claim 17 wherein the fuel-air mixer can be removed from the combustor.

19. The combustor of claim 17 wherein the fuel delivery line is located between swirler airflow passages of the first radial swirler.

20. The combustar of claim 17 wherein the swirler exit quarl is either converging, diverging or of a constant diameter relative to the swirler exit throat.

21. A gas turbine engine having a combustor comprising a fuel-air mixer, the fuel-air mixer comprising:
   an annular fuel injector having a fuel delivery line fluidly connected to an annular fuel distribution manifold, wherein the annular fuel distribution manifold is fluidly connected to a plurality of discrete plain jet orifices;
   a first radial swirler wherein the first swirler is located upstream from the discrete plain jet orifices and wherein the fuel delivery line is located between swirler airflow passages of the first radial swirler,
   a second radial swirler wherein the second swirler is located downstream from the discrete plain jet orifices;
   a swirler exit throat downstream of the second swirler; and
   a swirler exit quarl downstream of the swirler exit throat.

22. The gas turbine engine of claim 21 wherein the engine is a lean direct injection gas turbine engine.

23. The gas turbine engine of claim 21 wherein the engine is a rich burn-quick-quench-lean-burn engine.

* * * * *

UNITED STATES PATENT AND TRADEMARK OFFICE
CERTIFICATE OF CORRECTION

PATENT NO. : 7,065,972 B2  Page 1 of 1
APPLICATION NO. : 10/850871
DATED : June 27, 2006
INVENTOR(S) : Frank J. Zupanc It is certified that error appears in the above-identified patent and that said Letters Patent is hereby corrected as shown below:

Column 7, line 25, "to" should be changed to --the--.

Signed and Sealed this

Third Day of April, 2007

JON W. DUDAS
*Director of the United States Patent and Trademark Office*